Oct. 26, 1965 W. M. LEEDS 3,214,544
COOLING STRUCTURES FOR CLOSED-SYSTEM GASEOUS ELECTRICAL
APPARATUS HAVING TERMINAL BUSHINGS
Filed March 24, 1961 3 Sheets-Sheet 1

Fig. I.

WITNESSES:
Bernard R. Gieguez
James J. Young

INVENTOR
Winthrop M. Leeds
BY
Willard R. Crout
ATTORNEY

Oct. 26, 1965 W. M. LEEDS 3,214,544
COOLING STRUCTURES FOR CLOSED-SYSTEM GASEOUS ELECTRICAL
APPARATUS HAVING TERMINAL BUSHINGS
Filed March 24, 1961 3 Sheets-Sheet 2

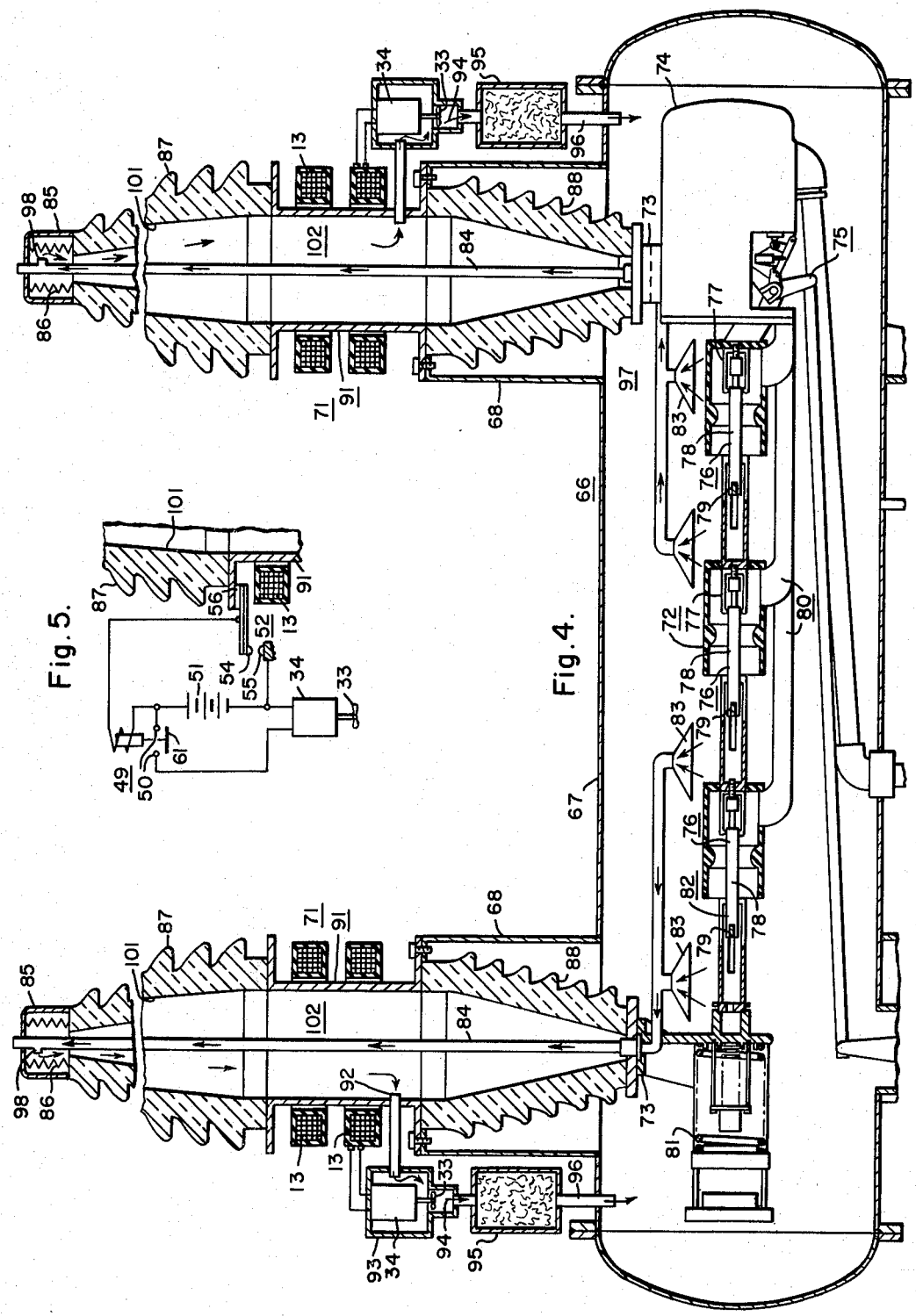

United States Patent Office 3,214,544
Patented Oct. 26, 1965

3,214,544
COOLING STRUCTURES FOR CLOSED-SYSTEM GASEOUS ELECTRICAL APPARATUS HAVING TERMINAL BUSHINGS
Winthrop M. Leeds, Forest Hills Borough, Pa., assignor to Westinghouse Electric Corporation, East Pittsburgh, Pa., a corporation of Pennsylvania
Filed Mar. 24, 1961, Ser. No. 98,135
10 Claims. (Cl. 200—148)

This invention relates generally to cooling structures for electrical aparatus, and, more particularly, to fluid-driving means for causing the circulation of a cooling medium within electrical apparatus for effecting the cooling of the current-carrying parts thereof.

A general object of the present invention is to provide an improved cooling structure for electrical apparatus, which structure is of simplified construction and is highly effective in operation.

A more specific object of the present invention is to provide improved fluid-moving means for driving a cooling fluid against heated current-carrying parts to extract heat therefrom, and to force the heated gas against cool portions of the apparatus so as to effect a net result of extraction of heat from hot portions of the electrical apparatus and transmission of this heat to cool portions of the apparatus. This enables the equipment to carry higher loads or to operate cooler at lower loads.

In United States patent application filed January 22, 1957, Serial No. 635,400, now U.S. Patent 2,981,814, issued April 25, 1961, to Robert E. Friedrich and assigned to the assignee of the instant application, there is illustrated and described a single-bushing type of circuit-interrupting structure. As set forth in the aforesaid patent application, a condenser bushing is mounted substantially horizontally, and has secured to the outer two extremities thereof puffer-type interrupting structures, which are simultaneously operated by a mechanical linkage. A pair of outwardly-extending porcelain shells encompass the two interrupting structures, and have their adjacent inner ends secured to a mechanism housing, which encloses the current transformers encircling the central portion of the condenser bushing. Terminal caps are secured to the outer ends of the porcelain shells, to which line terminal connections may be made. In the type of equipment, such as set forth in the aforesaid Friedrich application, and with the equipment also filled with a heavy gas, such as sulfur-hexafluoride ($SF_6$) gas, and mounted in a horizontal position, it has been found that such interrupting structures tend to run hot under load because of the poor heat transfer through the gas and also because of inadequate convection currents.

It is one of the objects of the present application to provide an improved cooling structure, of simplified type, for such a single-bushing type of circuit-interrupting structure, such as set forth in the aforesaid Friedrich patent application.

In United States patent application filed January 23, 1959, Serial No. 788,668, now U.S. Patent 3,057,983, issued October 9, 1962 to Russell N. Yeckley, Joseph Sucha and Benjamin P. Baker, and assigned to the assignee of the instant application, there is disclosed and claimed a high-power circuit-interrupting structure of the sulfur-hexafluoride ($SF_6$) type, which includes a generally horizontally-extending grounded dead-tank structure. Two terminal bushings extend downwardly substantially vertically into the interior of the grounded dead-tank structure and support at the lower ends thereof a generally horizontally-extending arc-extending assemblage. When such a heavy-power breaker carries load currents, again the problem is posed of assisting in the rapid transfer of heat from the contact structure so that the breaker may run cool under load conditions.

It is a further object of the present invention to apply novel cooling principles to a high-power circuit-interrupting structure of the aforesaid type to render the same more adaptable for carrying heavy load currents without overheating.

In terminal bushings utilizing sulfur-hexafluoride ($SF_6$) gas as the dielectric medium and thereby avoiding the necessity of utilizing a condenser body, again the problem of cooling the centrally-disposed terminal stud is presented. It is still a further object of the present invention to provide an improved terminal-bushing structure of the type utilizing a highly efficient dielectric gas, in which movement of the gas is assisted to bring about a transfer of heat from the parts which carry heavy load currents to the portions of the terminal-bushing structure which are relatively cool.

Further objects and advantages will readily become apparent upon reading the following specification, taken in conjunction with the drawings, in which:

FIGURE 4 is a generally longitudinal vertical sectional view taken through a high-power circuit-interrupting structure, the contact structure being illustrated in the closed-circuit position, and circulation of the cooling means being illustrated by the arrows;

FIGURE 5 is a fragmentary modification of the circuit-interrupting structure of FIGURE 4, illustrating an alternate manner of energizing the fan motor;

Figure 7:
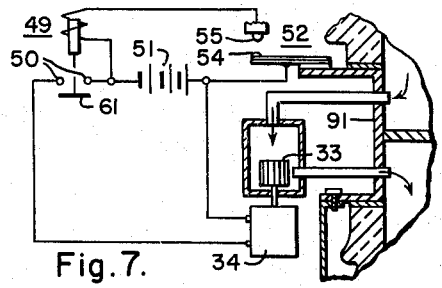
Figure 6:
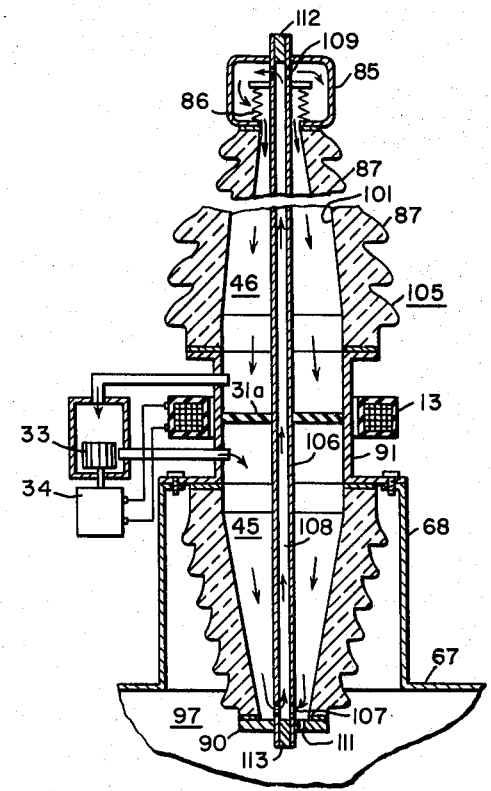
Figure 6A:
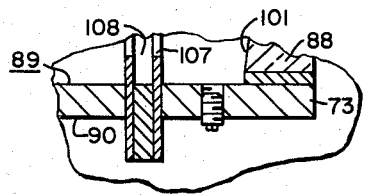

FIGURE 6 is a fragmentary vertical sectional view taken through a gas-filled terminal bushing, illustrating the circulation of gas to effect cooling of the hollow terminal stud by operation of a fan motor, the arrows indicating the direction of fluid flow. The terminal bushing is illlustrated as being applied to the type of high-power circuit-interrupting structure which is set forth in FIGURE 4 of the drawings;

FIGURE 6A is a fragmentary modification of the terminal bushing of FIGURE 6; and, FIGURE 7 is a fragmentary modification of the terminal-bushing structure of FIGURE 6, illustrating an alternate method of energizing the fan motor.

Figure 1:
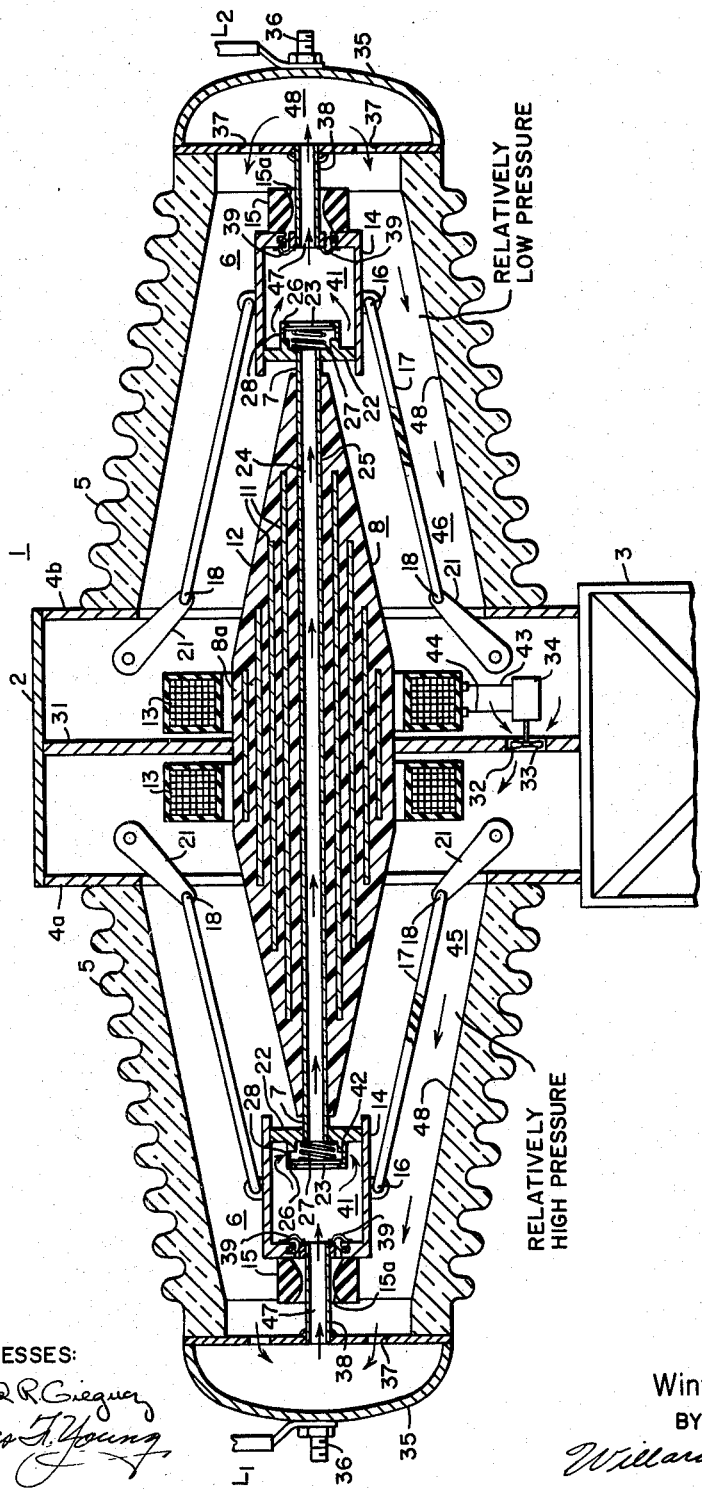
FIGURE 1 is a generally longitudinal vertical sectional view taken through a single-bushing type of circuit-interrupting structure, the contact structure being illustrated in the closed-circuit position, and gas circulation being indicated by the arrows.

Referring to the drawings, and more particularly to FIGURE 1 thereof, the reference numeral 1 generally designates a circuit-interrupting structure of the single-bushing type. As shown, the circuit interrupter 1 generally includes a centrally-disposed mechanism housing 2 supported up in the air by a grounded framework 3, only a portion of which is shown. The sides 4a, 4b of the mechanism housing 2 are annular in form, and have abutting thereagainst weatherproof casings 5, which enclose interrupting units 6 secured to the outer extremities 7 of a generally horizontally-extending condenser bushing 8.

It will be noted that the condenser bushing 8 generally includes a plurality of condenser elements 11, which serve to control the voltage gradient within the condenser body 12. A pair of ring-type current transformers 13 encompass the central portion 8a of the terminal bushing 8, and serve to provide a measure of the current passing through the terminal bushing 8.

Each of the interrupting structures 6, as shown, includes a puffer-type operating cylinder 14 having an orifice 15 secured thereto. The puffer-type operating cylinder 14 is pivotally connected, as at 16, to an insulating link 17 which, in turn, is pivotally connected, as at 18, to rotatable crank-arms 21. The rotatable crank-arms 21 extend through sealed bearing openings, not shown, and are operated externally of the mechanism housing 2 in any desired manner. In addition, it may be desired to effect their simultaneous operation, and suitable means may be provided for this purpose.

Associated with each of the interrupting structures 6 is a relatively stationary piston plate 22, threadedly secured to the outer extremity 7 of the condenser bushing 8. As shown, a valve structure 23 is employed to close the passage 24 through the hollow terminal stud 25 passing centrally through the terminal bushing 8.

A valve housing 26 is associated with the stationary piston 22, and provides a stop for the open position of the valve plate 23, the latter being biased to an open position by a compression spring 27. It will, therefore, be apparent that in the closed-circuit position of the circuit-interrupting structure 1, the compression spring 27 will ensure that the valve plates 23 will be in their open position, so that gas flow may take place through apertures 28 provided in the valve housing 26.

Disposed within the mechanism housing 2, encircling the condenser bushing 8, and extending in a substantially vertical direction is a partition plate 31. This partition plate 31 may be either of insulating material or of metallic material, although if it is desired to utilize metallic material, preferably a non-magnetic material is employed, or if it is desired to utilize a magnetic material, a suitable non-magnetic radially-extending weld seam is employed to prevent the partition plate 31 forming a closed magnetic link about the conductor stud 25.

As shown in FIGURE 1, the partition plate 31 has provided therein an aperture 32, within which is disposed the blade 33 of a fan motor 34, the terminals of which make a direct connection to the current transformer 13, as shown.

Disposed at the outer ends of the insulating shells 5 are a pair of terminal caps 35, to which line connections $L_1$ and $L_2$ may be made, as shown. It will be noted that the terminal caps 35 have apertures 37 provided therein, the purpose for which will be more apparent hereinafter. Tubular relatively stationary contacts 38 cooperate with segmental movable contacts 39 carried by and movable with the puffer cylinder 14.

The opening operation of the circuit interrupter 1 will now be described. During the opening operation, suitable means, not shown, are operable to provide synchronous rotation of the crank-arms 21 to effect thereby simultaneous inward opening movement of the pair of puffer cylinders 14. As mentioned, the puffer cylinders 14 carry therewith the movable contacts 39, which, after a slight delay, separate from the relatively stationary contacts 38 and draw two serially-related arcs within the circuit interrupting structure 1. Due to the build-up of pressure within the region 41 within each puffer cylinder 14, the valves 23 will close over the valve seats 42, and thereby prevent passage of gas through the passageway 24 of the tubular conductor stud 25. The pressure will rise within the regions 41 in both interrpting units 6, and will cause gas under pressure to be ejected out through the orifice opening 15a associated with the orifice members 15 to effect extinction of the arcs drawn therein. Continued opening movement of the crank-arms 21 will effect an isolating gap into the circuit.

During the closing operation, the crank-arms 21 are rotated by a suitable externally-disposed mechanism, and effects closing motion of the movable contacts 39 into engagement with the stationary contacts 38. In the closed-circuit position of the interrupter 1, it will be obvious that the circuit therethrough will include line cable $L_1$, conductor stud 36, terminal cap 35, stationary contact 38, movable contact 39, through the walls of the puffer cylinder 14 to relatively stationary piston 22. The circuit then extends through the hollow conductor stud 25, and through the right-hand interrupting unit 6 in a similar manner to the right-hand line cable $L_2$.

It will be noted that in the fully closed-circuit position of the interrupter 1, as illustrated in FIG. 1, that the valves 23 are in their open position, as afforded by the biasing action exerted by the compression springs 27. In addition, the fan motor 34 has connections 43, 44 with the terminals of the current transformer 13, and will be energized thereby when sufficient current passes through the terminal stud 25, as will be obvious. The energization of the fan motor 34 will effect corresponding rotation of the fan blade 33 and force gas through the aperture 32 provided in the diaphragm plate 31. This will cause the region 45 within the weatherproof casing 5 to be at relatively high pressure, whereas the region 46 within the hight-hand weatherproof casing 5 will be at relatively low pressure. As a result, the gas will be forced through the apertures 37 in the left-hand terminal cap 35 and through the interior 47 of the lef-hand stationary contact 38, into the interior 41 of left-hand puffer cylinder 14, through apertures 28 and into the passageway 24 of conductor stud 25. The gas will be forced through the right-hand interrupting unit 6 in a similar manner and through the passageway 47 of the right-hand relatively stationary contact 38. The gas will be forced into the region 48 disposed within the right-hand terminal cap 35, and then will be forced to flow through the aperture 37 and along the cool inner walls 48 of the right-hand casing 5.

From the foregoing description, it will be apparent that the circulation of the gas, as effected by the spinning of the fan blade 33 will cause circulation of gas, and hence extraction of the heat adjacent the contact structure 38, 39 and hollow conductor stud 25 to the cool inner walls 48 of the waterproof casings 5. Assisting in this cooling action will be the walls of the end terminal caps 35.

Figure 2:
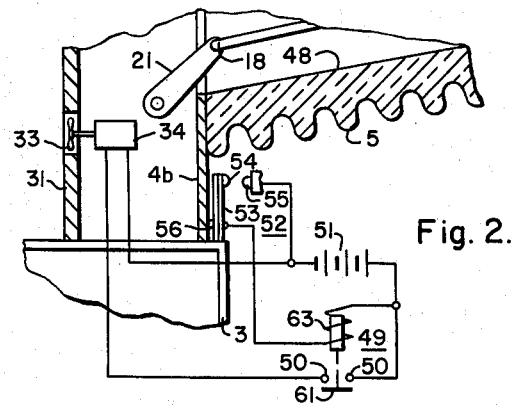
FIGURE 2 is a fragmentary modification of the circuit-interrupting structure of FIGURE 1, in which a modified type of means is illustrated to cause an energization of the fan motor.

FIGURE 1 shows a direct connection of the fan motor 34 with one of the current transformers 13. FIG. 2 shows the connection of the fan motor 34 through a battery 51 and a thermostatic switch 52. As shown, the thermostatic switch 52 includes a bimetallic element 53 having a contact 54. The contact 54 may, at times, make contacting engagement with a relatively stationary contact 55. The bimetallic element 53 makes heat conductive relationship with a base plate 56, which is preferably of a suitable heat-conducting material, such as copper. The base plate 56 is in intimate relation with the supporting flange plate 4b. It will be obvious that since the flange plate 4b is generally of magnetic material that during the passage of heavy load currents through the interrupter 1, eddy-current loss within the flange plate 4b will heat the same, and thereby effect deflection of the bimetallic element 53 so that the contacts 54, 55 may make engagement and thereby energize the relay 49. The contacts 50 of the relay 49 will energize the fan motor 34 through the battery 51.

Figure 3:
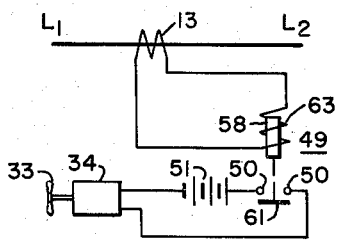
FIGURE 3 is a further modified manner of energizing the fan motor for the circuit-interrupting structure illustrated in FIGURE 1.

FIGURE 3 shows a modified manner of energizing the fan motor 34. Again a battery 51 is utilized with the relay 49. The latter has an armature 58. The armature 58 effects, at times, upward motion of a bridging contact 61 into engagement with contacts 50 to thereby energize the fan motor 34 through the battery 51. The coil 63 of the relay 49 is directly connected to one of the current transformers 13. As a result, when the current passing through the line $L_1$, $L_2$ attains a sufficient value, as reflected by the current passing through the current transformer 13, the relay 49 will be actuated to close the contacts 50 and energize thereby the fan motor 34. The current passing through the line $L_1$, $L_2$ will be indicative of the heating effect which takes place within the circuit interrupter 1.

Single-bushing type breakers filled with gas, such as $SF_6$, and mounted in a horizontal position tend to run hot under load because of the poor heat transfer through the gas and the inadequate convection currents. As set out above, the feature of the present invention provides the means of setting up a gas circulation under load, using a central non-magnetic partition 31 along the bushing 8 to divide the gas volume into a high-pressure region 45 on the left and a low-pressure region 46 on the right. A motor driven fan 33 provides this pressure differential, causing a cooling gas flow, as shown by the arrows, through the contacts, operating cylinders and hollow terminals.

Two schemes may be used to operate the fan motor 34. First, the fan motor 34 may be driven from a control battery 51, started by a relay 49 operated either by a temperature sensitive element 52, as illustrated in FIG. 2, or by the current magnitude from the current transformer 13, as illustrated in FIG. 3.

As illustrated in FIG. 1, a fan motor 34 may be driven directly from current transformer output when the load reaches a predetermined value. With this scheme, the fan speed can be made to increase as the load increases.

FIGURE 4 illustrates an application of the invention to a high-power circuit interrupter, generally designated by the reference numeral 66. As shown, the circuit interrupter 66 includes a grounded horizontally-extending dead tank 67 having upwardly extending supporting portions 68, through which extend terminal bushing structures 71. An arc-extinguishing assemblage, generally designated by the reference numeral 72, is supported from the lower ends 73 of the terminal-bushing structures 71.

As illustrated more in detail in the aforesaid U.S. Patent 3,057,983, the arc-extinguishing assemblage 72 includes a high-pressure reservoir tank 74, a blast-valve structure 75 and manifold means 80 to connect the high pressure gas with the contact structures, designated by the reference numeral 76. The contact structures 76 include relatively stationary contacts 77 and movable contacts 78. The movable contacts 78 are secured to the mid-points of a plurality of transversely-extending crossbars 79, the outer ends of which are, in turn, fixedly connected to a pair of longitudinally-extending insulating operating rods, not shown. A battery of biasing springs 81 bias the left-hand end of the ladder-like movable contact assemblage 82, comprising the several cross-bars 79 and the movable contacts 78, in a leftward opening direction. FIG. 4 illustrates the high-power breaker 66 in somewhat diagrammatic form, and hence reference is directed to the aforesaid U.S. Patent 3,057,983 for a detailed and more clear description of the operation of the several parts of the interrupter 66. For the purpose of understanding the present invention, however, it is only necessary to know that in the closed-circuit position of the circuit interrupter 66, as illustrated in FIG. 4, heat is generated by the passage of the heavy load current through the interrupter.

It will be observed that there are provided a plurality of insulating exhaust funnels 83, which serve to collect the heated gas, which rises by convection, and to transmit this heated gas interiorly through the hollow tubular conductor studs or conduit means 84 associated with the terminal bushings 71. The heated gas is directed upwardly through the hollow terminal studs 84 and into the cap structures 85, which house the biasing springs 86, which serve to maintain pressure upon the weatherproof shells 87, 88. A centrally-disposed grounded supporting-flange assembly 91 is provided, about which is disposed a pair of current transformers 13. These current transformers 13, as was the case with the interrupter 1 of FIG. 1, serve to provide a measure of the current magnitude passing through the interrupter 66.

As illustrated in FIG. 4, an inlet pipe 92 is associated with the flange assembly 91, and serves to transmit the gas into a motor housing 93, within which is disposed a fan motor 34. The fan blade 33 of the fan motor 34 forces the gas downwardly, as illustrated by the arrows 94 of FIG. 4, into a filter housing 95. A suitable filter material, such as activated alumina powder is disposed within the filter housing 95. This material serves to extract arced products of decomposition from the gas, which is preferably sulfur-hexafluoride ($SF_6$) gas. An outlet pipe 96 returns the gas into the general interior 97 within the tank structure 67.

United States patent application filed December 2, 1959, Serial No. 856,775, now U. S. Patent 3,059,044, issued October 16, 1962, to Robert E. Friedrich and James H. Frakes and assigned to the assignee of the instant invention broadly describes and claims the general features of the sulfur-hexafluoride terminal bushings 71.

From the foregoing description, it will be apparent that in the closed-circuit position of the interrupter 66, as illustrated diagrammatically in FIG. 4, the passage of heavy load currents through the interrupter will generate heat within the contact structures 76. The gas will become heated and will rise by natural convection flow. The rising heated gas will be caught by the exhaust funnels 83 and will be transmitted through the hollow terminal studs or extraction passages 84 to the upper cooled cap structures 85, where the gas will be exhausted through side ports 98, and downwardly along the inner walls 101 of the weatherproof casings 87, 88. This action will cool the gas.

The provision of the outlet pipes 92 will extract gas from the interior 102 within the terminal bushings 71, and will cause it to enter the motor housings 93, where the fan motors 34 will cause it to flow downwardly through the filter elements 95 and back into the general interior 97 of the tank 67.

From the foregoing description, it will be observed that again there is provided a means for circulating a cooling medium past the contact structures 76 and along the cool walls 101 of the weatherproof elements 87, 88 associated with the terminal bushings 71. It will be obvious that the rising of the heated gas from the contact structures 76 will, in turn, cause cool gas from the lower end of the tank 67 to rise past the contact structure to replace the heated gas which has been collected.

From the foregoing, it will be apparent that similar principles to those set forth in relationship with the circuit interrupter 1 of FIGURE 1, may be applied to the sulfur-hexafluoride ($SF_6$) insulated circuit breaker 66 of the dead-tank type with terminal bushings 71 and current transformers 13. Gas is circulated by a motor driven fan 33 at each terminal bushing 71, drawing warm gas from the neighborhood of the breaker contacts 76, up through the hollow terminal studs 84 to the caps 85 at the top of the bushings. Then the gas is forced down between the porcelain weather casings 87 and the terminal studs 84 to the grounded flange assemblies 91. The gas is then sent through an outlet pipe 92 to the fan 34 and through a filter 95 containing activated alumina powder. The filter element 95 may be optional. The gas is finally forced back into the general interior 97 of the main ground tank 67.

The fan motor 34 can be run directly from a current transformer 13, when the load current reaches a predetermined value, or from a separate source of power turned on by a temperature responsive relay 49, as illustrated in FIG. 5.

With reference to FIG. 5, it will be apparent that again there is provided a thermostatic switch 52, which is disposed in heat-conductive relationship with the grounded flange assembly 91.

From the foregoing description, it will be apparent that the circulating arrangement of the gas will permit a substantial increase in the continuous current-carrying capacity of the gas-insulated circuit breaker 66.

FIGURE 6 illustrates an application of the principles of the present invention to a gas-insulated terminal bushing 105. The terminal bushing 105 may be associated with a grounded tank structure 67 of a high-power circuit interrupter, not shown, or alternatively, the terminal bushing 105 may be used as a separate self-contained unit such as a roof bushing, or be used as the terminal of some other electrical apparatus such as a power transformer.

It will be noted that the passage of current through the terminal stud 106 of the terminal bushing 105 will generate heat therein. Again a fan motor 34 may be employed driving a blower 33, which will cause a circulation of gas to flow in the direction indicated by the arrows. It will be noted that the gas is forced to flow downwardly and into apertures 107 associated with the lower end of the hollow terminal stud 106. The gas will pass through the interior 108 of the terminal stud 106, and out through apertures 109 associated with the upper end of the terminal stud 106. The cool walls of the cap 85 and the inner walls 101 of the weatherproof casing 87 will assist in cooling the gas. As was the case with FIG. 1, an insulating partition plate 31α is provided to effect the relatively high-pressure region 45 and a relatively low-pressure region 46. A current transformer 13 may encircle the centrally-disposed grounded flange assembly 91, as shown The terminal bushing 105 may be filled with a dielectric gas, such as sulfur-hexafluoride ($SF_6$) gas, independently of the filling within the tank structure 67, as illustrated by the modified type terminal-bushing structure 89 of FIG. 6A. Or, if it is desired, an opening 111 may be provided in the lower closure plate 90 to permit the passage of sulfur-hexafluoride gas from the interior 97 of the tank 67 into the interior 45 of the terminal bushing 105. It will be noted that in the construction, set forth in FIG. 6, plugs 112, 113 are provided to plug up the ends of the hollow conductor stud 106.

Although the fan motor 34 in FIG. 6 is directly connected to the current transformer 13, when desirable, it may be connected with an external control battery 51, as illustrated in FIG. 7 of the drawings. With reference to FIG. 7, it will be noted that again there is provided a thermostatic switch 52, which is dispose in the heat-conductive relationship with the grounded flange assembly 91. In addition, the load relay 49 is employed and connected in a manner similar to that set forth in FIG. 2 of the drawings.

From the foregoing description of the invention, it will be aparent that there is provided herein novel gas-moving means for effecting a circulating cooling flow of gas within electrical apparatus. The electrical apparatus may be either a circuit interrupter, in which the passage of heavy load currents cause a heating of the contact parts, or the electrical apparatus may be a self-contained terminal bushing 105, such as the type set forth in FIG. 6 of the drawings. Additionally, it has been illustrated how the gas may not only be circulated, but also may be cleaned by the utilization of a filter element 95, such as illustrated in FIG. 4 of the drawings.

Although there has been illustrated and described specific structures, it is to be clearly understood that the same were merely for the purpose of illustration, and that changes and modifications may readily be made therein by those skilled in the art, without departing from the spirit and scope of the invention.

I claim:

1. A circuit interrupter including tank means and contact means disposed therein one or more terminal-bushing structures extending into said tank means and having an external insulating shell exposed to the surrounding atmosphere, exhaust funnel means disposed within said tank means for collecting the heated gas rising by convection flow from the contact means during normal load-carrying operation of the interrupter when the contact means is closed, conduit means disposed within the terminal bushing, and fluid-driving means for forcing the collected gas through the conduit means of at least one terminal-bushing structure and along the interior of said external shell to effect the cooling thereof during such load-carrying operation whereby the contact means may be cooled.

2. A gas-type circuit interrupter including a grounded metallic tank having a pair of spaced terminal bushings extending downwardly therewithin, an arc-extinguishing assemblage electrically bridging the lower interior ends of the terminal bushings and at least partially supported thereby, one or more serially-related separable contact structures extending axially along said arc-extinguishing assemblage, a collecting funnel structure disposed above at least one separable contact structure for collecting heated gas rising by virtue of being heated by the load current passing through the assemblage while the one or more separable contact structures are in the closed position, at least one of the terminal bushings having a gas-suction means and conduit means associated therewith to draw gas from said collecting funnel structure into the conduit means of the terminal bushing adjacent the external end of said terminal bushing, and means for directing the drawn heated gas along cool surfaces interiorly of the terminal bushing prior to subsequent ejection into the general interior of the tank whereby said one separable contact structure may be cooled.

3. A gas-type circuit interrupter including a grounded metallic tank having a pair of spaced terminal bushings extending downwardly therewithin, at least one terminal bushing having an external insulating shell and conduit means associated therewith, an arc-extinguishing assemblage electrically bridging the lower interior ends of the terminal bushings and at least partially supported thereby, one or more serially-related separable contact structures extending axially along said arc-extinguishing assemblage, a collecting funnel structure disposed above at least one separable contact structure for collecting heated gas rising by virtue of being heated by the load current passing through the assemblage while the one or more separable contact structures are in the closed position, said one terminal bushing having a gas impeller disposed adjacent the grounded mid-portion thereof to draw heated gas from the collecting funnel structure through said conduit means and along cool inner surfaces of the terminal bushing shell for heat extraction prior to subsequent ejection into the general interior of the tank whereby said one separable contact structure may be cooled.

4. The combination according to claim 2, wherein said one terminal bushing has a hollow terminal stud constituting a portion of the passageway for the heated gas.

5. The combination according to claim 3, wherein said one terminal bushing has a hollow terminal stud constituting a portion of the passageway for the heated gas.

6. In combination, a grounded tank having separable contact structure disposed therewithin, a terminal bushing extending into the tank and having a tubular terminal stud and an external insulating shell, collecting funnel means disposed above the separable contact structure and in fluid-passageway communication with said tubular terminal stud, cooling cap structure at the outer end of the terminal bushing in fluid communication with the outer end of the tubular terminal stud, fluid-impelling means associated with the terminal bushing for drawing heated fluid from the collecting funnel means through the tubular terminal stud, past the cooling cap structure along the inner wall of said external insulating shell and back into the general interior of the tank while the one or more separable contact structures are in the closed position, whereby the temperature of the separable contact structure may be lowered during the passage of load currents through the contact structure.

7. The combination of claim 6 wherein the fluid-impelling means is situated at the grounded attaching location of the terminal bushing to the grounded tank.

8. A compressed-gas circuit interrupter containing a circulating gas of the type which may become decomposed during arcing, a grounded tank having a pair of spaced terminal bushings extending therewithin, at least one terminal bushing having an external insulating shell, an arc-extinguishing assemblage including a plurality of serially-related separable contact structures, said arc-extinguishing assemblage being at least partially supported by the interior ends of the terminal bushings, a high-pressure gas-reservoir chamber associated with the arc-extinguising assemblage, blast-valve means for causing a blast of high-pressure gas to be forced adjacent the separable contact structures during the opening operation of the circuit interrupter, collecting-funnel means including one or more funnel elements for collecting heated gas from the separable contact structure during the passage of load currents through the arc-extinguishing assemblage while the separable contact structures are closed, at least said one terminal bushing in addition having a gas-extracting passageway associated therewith, fluid-impelling means for causing the heated gas from the funnel means to be passed through the extraction passageway and along the cool inner surface of said terminal bushing shell, filtering means associated with said one terminal bushing, and gas-directing passageway means for causing the heated collected gas from the funnel means to pass through the gas extracting passageway of said one terminal bushing along the cool inner surface of said external terminal bushing shell and through said filter means prior to a subsequent ejection into the general interior of the tank whereby the separable contact structures may be cooled.

9. The combination according to claim 8, wherein the said one terminal bushing has a tubular hollow terminal stud through which the heated gas from the funnel means may pass.

10. The combination according to claim 9, wherein the said one terminal bushing has a cooling-cap structure and the tubular conductor stud is in fluid communication with said cooling-cap structure.

References Cited by the Examiner

UNITED STATES PATENTS

| | | | |
|---|---|---|---|
| 991,483 | 5/11 | Creighton | 200—148 |
| 2,636,921 | 4/53 | Marbury | 174—16 |
| 2,742,582 | 4/56 | Bahn et al. | 174—15 |
| 2,824,939 | 2/58 | Claybourn et al. | 200—166 |
| 2,853,540 | 9/58 | Camilli et al. | 200—148 |
| 2,955,182 | 10/60 | Caswell et al. | 200—148 |
| 2,981,814 | 4/61 | Friedrich | 200—145 |
| 3,009,042 | 11/61 | Schrameck et al. | 200—148 |
| 3,067,279 | 12/62 | Baker | 174—18 |

FOREIGN PATENTS

| | | |
|---|---|---|
| 716,624 | 1/42 | Germany. |
| 51,222 | 10/41 | Holland. |
| 246,358 | 9/47 | Switzerland. |

BERNARD A. GILHEANY, *Primary Examiner.*

MAX L. LEVY, ROBERT K. SCHAEFER, *Examiners.*